US012218427B2

(12) United States Patent
Vollbracht et al.

(10) Patent No.: US 12,218,427 B2
(45) Date of Patent: Feb. 4, 2025

(54) RADAR ANTENNA ASSEMBLY AND RADAR SYSTEM

(71) Applicant: Aptiv Technologies Limited, Schaffhausen (CH)

(72) Inventors: Dennis Vollbracht, Hilden (DE); Mathias Busch, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/817,909

(22) Filed: Aug. 5, 2022

(65) Prior Publication Data

US 2023/0045388 A1 Feb. 9, 2023

(30) Foreign Application Priority Data

Aug. 6, 2021 (EP) .................................... 21190101

(51) Int. Cl.
*H01Q 19/17* (2006.01)
*H01Q 1/32* (2006.01)

(52) U.S. Cl.
CPC .......... *H01Q 19/17* (2013.01); *H01Q 1/3233* (2013.01); *H01Q 1/3283* (2013.01)

(58) Field of Classification Search
CPC ...... H01Q 1/32; H01Q 1/3233; H01Q 1/3283; H01Q 1/3291; H01Q 19/123; H01Q 19/17
See application file for complete search history.

(56) References Cited

U.S. PATENT DOCUMENTS

| | | | | |
|---|---|---|---|---|
| 3,794,997 | A | 2/1974 | Iwatsuki et al. | |
| 4,210,357 | A | 7/1980 | Adachi | |
| 4,933,681 | A * | 6/1990 | Estang | H01Q 1/28 343/705 |
| 2006/0092076 | A1 | 5/2006 | Franson | |
| 2019/0165462 | A1* | 5/2019 | Shiozaki | H01Q 15/14 |
| 2021/0011144 | A1 | 1/2021 | Crosby | |
| 2021/0203065 | A1* | 7/2021 | Stephan | H01Q 1/3233 |
| 2021/0239791 | A1 | 8/2021 | Vollbracht et al. | |
| 2023/0037906 | A1 | 2/2023 | Bollbracht et al. | |

(Continued)

FOREIGN PATENT DOCUMENTS

| | | | | |
|---|---|---|---|---|
| DE | 4412769 | | 10/1995 | |
| DE | 4412769 | A1 * | 10/1995 | G01S 13/931 |
| DE | 10109371 | | 11/2001 | |

(Continued)

OTHER PUBLICATIONS

IEEE Standard for Definitions of Terms for Antennas, 2013, The Institute of Electrical and Electronics Engineers, Inc., retrieved from https://ieeexplore.ieee.org/document/6758443 (Year: 2013).*

(Continued)

*Primary Examiner* — Dameon E Levi
*Assistant Examiner* — Leah Rosenberg
(74) *Attorney, Agent, or Firm* — Harness, Dickey & Pierce, P.L.C.

(57) ABSTRACT

A radar antenna assembly for a vehicle includes a feed horn configured to transmit and/or receive radar signals and a metallic component of the vehicle. The metallic component of the vehicle includes a curved or faceted surface portion, and the feed horn is positioned such that the curved or faceted surface portion forms a reflector for the feed horn.

6 Claims, 4 Drawing Sheets

(56) References Cited

U.S. PATENT DOCUMENTS

| | | | | |
|---|---|---|---|---|
| 2023/0039021 | A1 | 2/2023 | Bollbracht et al. | |
| 2023/0147256 | A1* | 5/2023 | Koch | H01Q 25/007 342/188 |

FOREIGN PATENT DOCUMENTS

| | | | | | |
|---|---|---|---|---|---|
| DE | 10060603 | | | 6/2002 | |
| DE | 102016125190 | | | 6/2018 | |
| DE | 102017223471 | | | 6/2019 | |
| DE | 102019200127 | | | 7/2020 | |
| EP | 0805360 | | | 11/1997 | |
| EP | 0978729 | | | 2/2000 | |
| EP | 3524759 | B1 | * | 10/2020 | E05B 81/77 |
| JP | S5534541 | | | 3/1980 | |
| JP | H11160426 | | | 6/1999 | |
| JP | H11160426 | A | * | 6/1999 | |
| JP | 2019009713 | | | 1/2019 | |
| WO | 2013095223 | | | 6/2013 | |

OTHER PUBLICATIONS

"Extended European Search Report", EP Application No. 21190108.7, May 3, 2022, 20 pages.

"Extended European Search Report", EP Application No. 21190101.2, Jan. 18, 2022, 12 pages.

"Extended European Search Report", EP Application No. 21190090.7, Jan. 26, 2022, 10 pages.

"Partial European Search Report", EP Application No. 21190108.7, Feb. 3, 2022, 17 pages.

* cited by examiner

RADAR ANTENNA ASSEMBLY AND RADAR SYSTEM

INCORPORATION BY REFERENCE

This application claims priority to European Patent Application Number 21190101.2, filed Aug. 6, 2021, the disclosure of which is incorporated by reference in its entirety.

BACKGROUND

Radar systems installed on vehicles are increasingly used to monitor the traffic space and in particular to detect objects like other vehicles, pedestrians, or stationary obstacles present in the traffic space. Many advanced driver assistance systems (ADAS), such as lane departure warning systems, lane change assistance systems, and active brake assist systems, rely on input signals provided by radar systems. Vehicle radar systems are also important for autonomous driving (AD) applications. Objects in the environment of a vehicle may be identified by means of transmitting a primary radar signal into the traffic space, receiving a secondary radar signal reflected by at least one object, and processing the secondary radar signal.

Usually, automotive radar systems are provided as modules comprising an integrated radar circuit and a radar antenna assembly arranged on a common board. The antenna aperture and the antenna gain of such modules is limited. Further, due to the plurality of constructional elements which are necessary for such a module, the fabrication costs are comparatively high. Radar antenna assemblies having a feed horn and a reflector are difficult to install on vehicles because of increasingly strict space restrictions.

Accordingly, there is a need to provide vehicle radar antenna assemblies which are easy to produce and which have improved aperture and gain values.

SUMMARY

The present disclosure provides a radar antenna assembly and a radar system according to the independent claims. Example embodiments are given in the subclaims, the description, and the drawings. The present disclosure further relates to vehicle radar antenna assemblies and vehicle radar systems.

In one aspect, the present disclosure is directed at a radar antenna assembly for a vehicle, with the radar antenna assembly comprising a feed horn configured to at least one of transmit or receive radar signals and a metallic component of the vehicle. The metallic component of the vehicle comprises a curved or faceted surface portion, and the feed horn is positioned such that the curved or faceted surface portion forms a reflector for the feed horn.

Thus, the metallic component of the vehicle may be at least partially used as an antenna reflector. By incorporating an already present structure of the vehicle into the antenna design, the material costs may be reduced. In particular, a separate reflector may be omitted. The metallic component of the vehicle may have a relatively large size and thus provide a large reflector surface. Therefore, the aperture and the gain of the radar antenna assembly may be considerably extended compared to radar building blocks.

The radar antenna assembly may further comprise one or more of the following features:

The metallic component may form at least a part of a crash beam, a bumper, a pillar, or a door of the vehicle. The feed horn may be fixed to the metallic component of the vehicle. In a mounted state of the metallic component of the vehicle, the curved or faceted surface portion may face away from a center of the vehicle. The curved or faceted surface portion may be cylindrically or elliptically shaped. The metallic component may have a recess and an insert member insertable into the recess, wherein the insert member comprises the curved or faceted surface portion.

The feed horn may comprise a waveguide member for a connection of the feed horn to a radar circuit, wherein the metallic component comprises a passage through which the waveguide member is guided. The passage may be located in a central region of the curved or faceted surface portion. Alternatively, the passage may be located outside the curved or faceted surface portion.

The feed horn may comprise a plurality of individual antenna elements and a plurality of waveguide members for respective connections of the antenna elements to a radar circuit. The waveguide members may be arranged in a common conduit which is guided through the passage. The individual antenna elements may be output ends of the waveguides. At least two of the individual antenna elements may be connected to separate transmitters of a radar circuit.

According to an embodiment, the metallic component forms at least a part of a crash beam, a bumper, a pillar, or a door of the vehicle. Usually, such metallic structures are already present in a motor vehicle and may be used as a component of a radar antenna assembly. The metallic component may have a surface area of at least 400 square centimeters ($cm^2$), in particular of at least 1000 $cm^2$. A relatively large reflector size enhances the gain and the aperture of the radar antenna assembly.

According to another embodiment, the feed horn is fixed to the metallic component of the vehicle.

According to another embodiment, in a mounted state of the metallic component of the vehicle, the curved or faceted surface portion faces away from a center of the vehicle to enable a monitoring of the surrounding of the vehicle. The curved or faceted surface portion may be concave with respect to the feed horn.

According to another embodiment, the curved or faceted surface portion is cylindrically or elliptically shaped. The shape of the curved or faceted surface portion may be adapted to the requirements of the application. The feed horn may be positioned in a focal region of the reflector.

According to another embodiment, the feed horn comprises a waveguide member for a connection of the feed horn to a radar circuit, and the metallic component comprises a passage through which the waveguide member is guided. This allows for a particularly compact design. The waveguide may be at least partially made from a plastic material.

According to another embodiment, the passage is located in a central region of the curved or faceted surface portion. This facilitates the provision of an at least essentially symmetric beam shape.

Alternatively, the passage may be located outside the curved or faceted surface portion. The connection of the feed horn to a control board is thereby simplified.

In another aspect, the radar antenna assembly has an offset reflector design. The space occupied by the radar antenna assembly in front of the metallic component is thereby minimized. Further, the sidelobe suppression and the polarization purity may be increased. Alternatively or additionally, the radar antenna assembly may have a Cassegrain design.

According to another embodiment, the feed horn comprises a plurality of individual antenna elements and a plurality of waveguide members for respective connections of the antenna elements to the radar circuit. An advanced beam steering may thus be provided.

According to another embodiment, the waveguide members are arranged in a common conduit which is guided through the passage. The conduit protects the waveguide members and improves the stability of the assembly.

According to another embodiment, the individual antenna elements are output ends of the waveguides. The output ends may be shaped dependent on the requirements of the application.

According to another embodiment, at least two of the individual antenna elements are connected to separate transmitters of a radar circuit. Thus, several transmitter channels may be provided to enable a beam steering.

According to another embodiment, the metallic component has a recess and an insert member insertable into the recess, wherein the insert member comprises the curved or faceted surface portion. A manufacturer of the radar system may easily prefabricate a module comprising the insert member and deliver the module to a manufacturer of the vehicle, who inserts the insert member into the recess of an existing crash beam or the like.

In another aspect, the present disclosure is directed at a radar antenna assembly for a vehicle, with the radar antenna assembly comprising a feed horn configured to at least one of transmit or receive radar signals and a metallic plate member. The metallic plate member comprises a curved or faceted surface portion, and the feed horn is fixed to the metallic plate member such that the curved or faceted surface portion forms a reflector for the feed horn. The metallic plate member is configured for an insertion in a recess of a metallic component of the vehicle.

In another aspect, the present disclosure is directed at a radar system for a vehicle, with the radar system comprising a radar antenna assembly as disclosed above and a radar circuit configured to at least one of generate or process radar signals. The radar circuit is configured for at least one of a multiplex operation, a multiple input multiple output (MIMO) operation, or a frequency scan operation of the radar antenna assembly. This provides for an extended beam steering range. The radar circuit may be formed on a printed circuit board. This enables a space saving construction. The radar circuit may comprise a monolithic microwave integrated circuit (MMIC). The radar circuit may be arranged in a housing which is attached to the metallic component of the vehicle. The housing protects the radar circuit from dust, splash water, and the like.

In another aspect, the present disclosure is directed at a vehicle comprising a chassis, a body, and a radar system comprising a radar antenna assembly as disclosed herein, with the metallic component being a portion of at least one of the chassis or the body of the vehicle.

BRIEF DESCRIPTION OF THE DRAWINGS

Example embodiments and functions of the present disclosure are described herein in conjunction with the following drawings, showing schematically.

DETAILED DESCRIPTION

Figure 1:
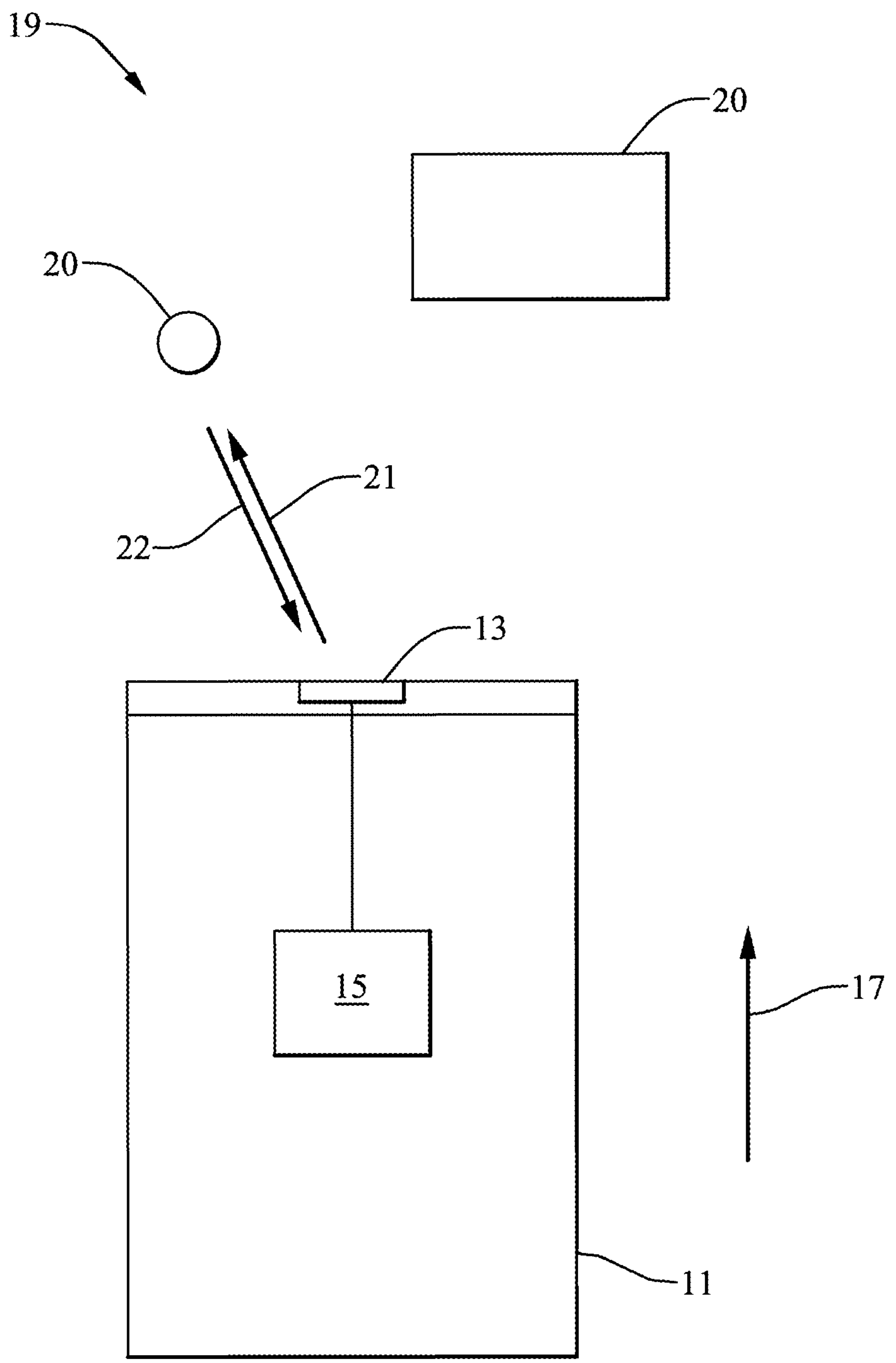
FIG. 1 is a motor vehicle equipped with a radar system.

FIG. 1 schematically depicts a motor vehicle 11, also called a host vehicle, and a radar system 13 mounted to a front portion of the motor vehicle 11. The radar system 13 is connected to an electronic processing device 15, for example an advanced driver assistance system or an autonomous driving system. In operation, the motor vehicle 11 is moving in a driving direction 17 in a traffic space 19, for example a road. Objects 20, such as other vehicles, pedestrians, or stationary obstacles, may be located in the traffic space 19.

The radar system 13 is configured for transmitting at least one primary radar signal 21 into the traffic space 19 and for detecting objects 20 present in the traffic space 19 on the basis of at least one secondary radar signal 22 reflected by the objects 20, as is generally known in the art.

Figure 2:
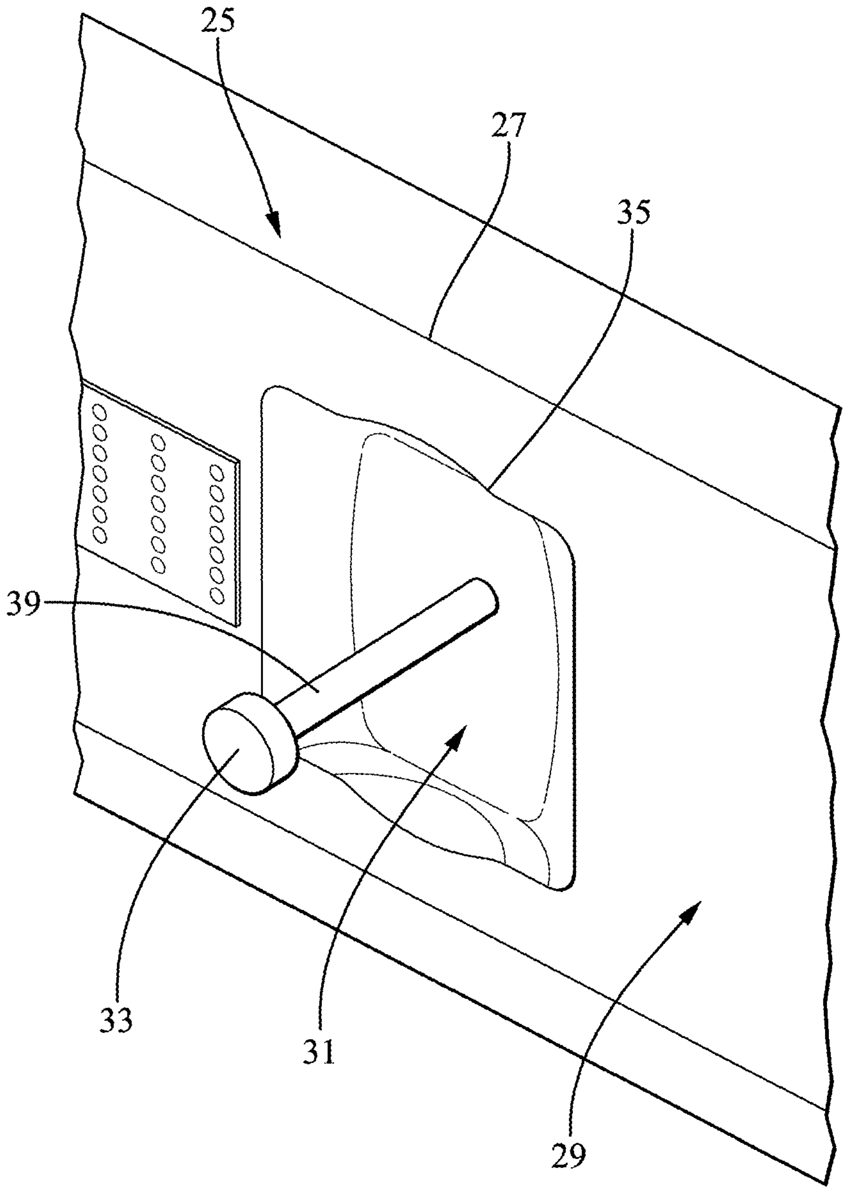
FIG. 2 is a radar antenna assembly according to a first embodiment in a perspective view.
Figure 3:
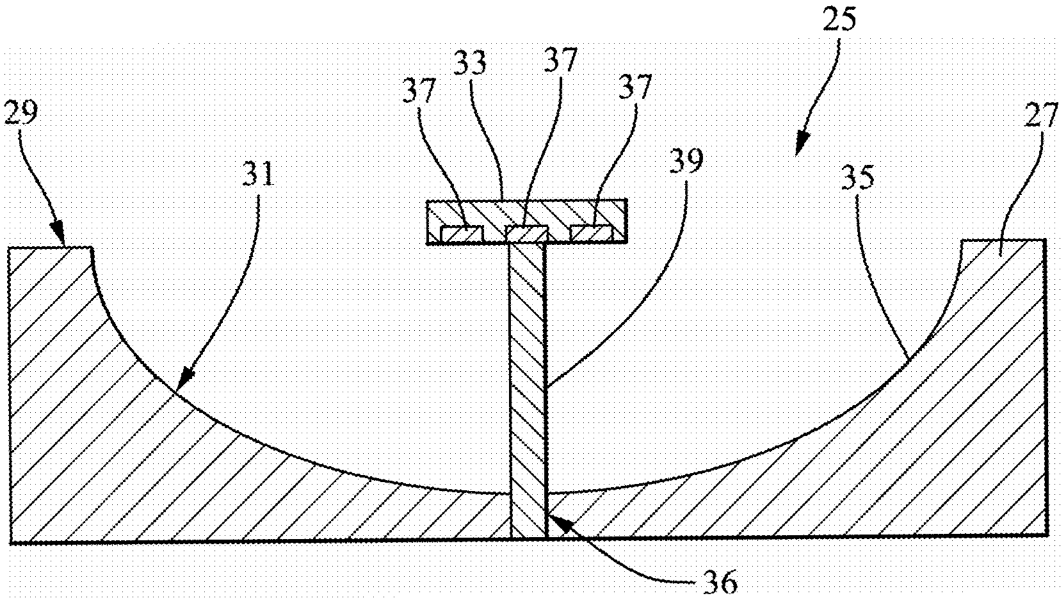
FIG. 3 is the radar antenna assembly according to FIG. 2 in a sectional side view.

According to various embodiments, and with reference also to FIGS. 2 and 3, the radar system 13 comprises a radar antenna assembly 25 for transmitting primary radar signals 21 into the traffic space 19 and for receiving secondary radar signals 22 reflected by objects 20 present in the traffic space 19. The radar antenna assembly 25, which is schematically depicted in FIGS. 2 and 3, is integrated in a crash beam 27 of the vehicle 11 (FIG. 1). The crash beam 27, which may be made from steel or another metal, is fixedly connected to a frame or a body of the vehicle 11. For example, the crash beam 27 may be configured as a hollow profile. A front surface 29 of the crash beam 27 comprises a curved surface portion 31 in the form of a depression.

The radar antenna assembly 25 comprises a feed horn 33 and a reflector 35—i.e., the radar antenna assembly 25 is of the reflector type in some embodiments. As shown, the reflector 35 is formed by the curved surface portion 31 of the crash beam 27. Depending on the application, the curved surface portion 31 may be spherically, parabolically, cylindrically, or elliptically shaped. In the embodiment shown in FIGS. 2 and 3, the feed horn 33 enters the reflector 35 in a central region of the curved surface portion 31. As schematically shown in FIG. 3, the feed horn 33 comprises a plurality of antenna elements 37 pointing to the reflector 35. The antenna elements 37 may be configured as end portions of plastic waveguide members, not shown, which are received in a common conduit 39 and guided, via a passage 36 of the crash beam 27, through the curved surface portion 31. For some applications, a feed horn having a single antenna element 37 may be sufficient.

The waveguide members are connected to transmitters and/or receivers of a radar circuit (not shown) of the radar system 13. The radar circuit may be configured to generate and process radar signals, as is generally known. For example, the radar circuit may be configured as a monolithic microwave integrated circuit (MMIC). The radar circuit may be arranged in a cavity of the crash beam 27. Thus, only little installation space is required for the radar system 13.

The crash beam 27 may have a recess and an insert member comprising the curved surface portion 31, wherein the insert member is insertable into the recess. In other words, the reflector 35 may be configured as an insert member. A manufacturer of the radar system 13 may easily prefabricate a module comprising the reflector 35 and deliver the module to a manufacturer of the vehicle 11, who inserts the reflector 35 into the recess of the crash beam 27.

Figure 4:
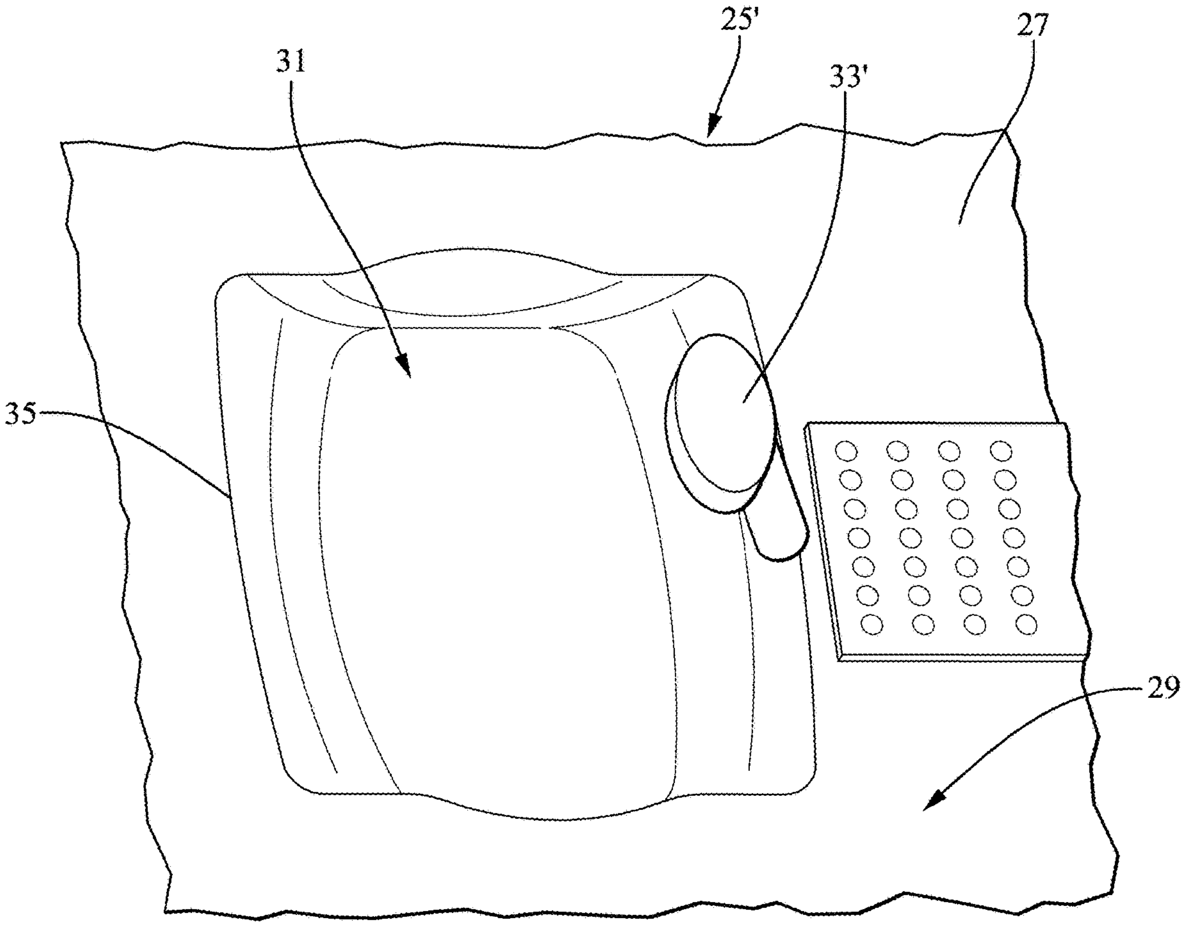
FIG. 4 is a radar antenna assembly according to a second embodiment.

FIG. 4 shows a radar antenna assembly 25' according to another embodiment. The depicted radar antenna assembly 25' has an offset reflector configuration. As shown, the feed horn 33' is located outside the curved surface portion 31. Due to the illumination of the reflector 35 from the side, the connection of the feed horn 33' to the corresponding control board is simplified. The offset reflector configuration provides for an improved sidelobe suppression and for an increased polarization purity.

Apart from the configurations shown in FIGS. 2-4, the feed horn 33, 33' may enter the reflector 35 at other positions to adapt the side lobe suppression and the polarization purity as desired. Moreover, instead of a curved surface portion 31 as shown in FIGS. 2-4, a faceted portion of the crash beam 27 may form the reflector 35.

The feed horn 33, 33' may be operated in a frequency scanning mode to provide a large beam steering range with only one transmitter. Further beam steering capabilities may be achieved by operating a feed horn 33, 33' comprising several transmitters in a phased array mode. A combination of a frequency scanning and a phased array scanning provides a particularly large beam steering range. The disclosed radar system 13 may exhibit an antenna gain value of approximately 40 decibels relative to an isotropic antenna (dBi). In combination with a circulator at the input port of the reflector 35, a signal to noise ratio of approximately 60 decibels (dB) may be achieved.

Instead of the curved surface portion 31 of the crash beam 27, a curved surface portion of another existing body or frame structure of the vehicle 11 may be used as a reflector 35. Thus, the curved surface portion 31 may be, for example, a portion of an A-pillar, a bumper, or a door of the vehicle 11.

The use of an existing metallic structure of a vehicle 11 as a reflector 35 of a radar antenna assembly 25, 25' is possible in connection with a wide variety of antenna types, for example bistatic, grouped, and multiple input multiple output antennas.

EXAMPLE IMPLEMENTATIONS

Example 1

Radar antenna assembly for a vehicle, the radar antenna assembly comprising: a feed horn configured to transmit and/or receive radar signals; and a metallic component of the vehicle, wherein the metallic component of the vehicle comprises a curved or faceted surface portion, and the feed horn is positioned such that the curved or faceted surface portion forms a reflector for the feed horn.

Example 2

The radar antenna assembly of example 1, wherein the metallic component forms at least a part of a crash beam, a bumper, a pillar, or a door of the vehicle.

Example 3

The radar antenna assembly of example 1 or example 2, wherein the feed horn is fixed to the metallic component of the vehicle.

Example 4

The radar antenna assembly of at least any one of examples 1 to 3, wherein, in a mounted state of the metallic component of the vehicle, the curved or faceted surface portion faces away from a center of the vehicle.

Example 5

The radar antenna assembly of at least any one of examples 1 to 4, wherein the curved or faceted surface portion is cylindrically or elliptically shaped.

Example 6

The radar antenna assembly of at least any one of examples 1 to 5, wherein the feed horn comprises a waveguide member for a connection of the feed horn to a radar circuit, and wherein the metallic component comprises a passage through which the waveguide member is guided.

Example 7

The radar antenna assembly of example 6, wherein the passage is located in a central region of the curved or faceted surface portion.

Example 8

The radar antenna assembly of example 6, wherein the passage is located outside the curved or faceted surface portion.

Example 9

The radar antenna assembly of at least any one of examples 6 to 8, wherein the feed horn comprises a plurality of individual antenna elements and a plurality of waveguide members for respective connections of the antenna elements to the radar circuit.

Example 10

The radar antenna assembly of example 9, wherein the waveguide members are arranged in a common conduit which is guided through the passage.

Example 11

The radar antenna assembly of at least one of examples 9 to 10, wherein at least two of the individual antenna elements are connected to separate transmitters of a radar circuit.

Example 12

The radar antenna assembly of at least any one of examples 1 to 11, wherein the metallic component has a recess and an insert member insertable into the recess, and wherein the insert member comprises the curved or faceted surface portion.

Example 13

Radar antenna assembly for a vehicle, the radar antenna assembly comprising: a feed horn configured to transmit and/or receive radar signals; and a metallic plate member, wherein the metallic plate member comprises a curved or faceted surface portion, wherein the feed horn is fixed to the metallic plate member such that the curved or faceted surface portion forms a reflector for the feed horn, and wherein the metallic plate member is configured for an insertion in a recess of a metallic component of the vehicle.

Example 14

Radar system for a vehicle, the radar system comprising the radar antenna assembly of at least any one of examples 1 to 13 and a radar circuit for generating and/or processing radar signals, wherein the radar circuit is configured for a multiplex operation, a multiple input multiple output (MIMO) operation, and/or a frequency scan operation of the radar antenna assembly.

Example 15

Vehicle comprising a chassis, a body, and a radar system comprising the radar antenna assembly of at least any one of examples 1 to 13, wherein the metallic component is a portion of the chassis or the body.

LIST OF REFERENCE CHARACTERS FOR THE ELEMENTS IN THE DRAWINGS

The following is a list of certain items in the drawings, in numerical order. Items not listed in the list may nonetheless be part of a given embodiment. For better legibility of the text, a given reference character may be recited near some, but not all, recitations of the referenced item in the text. Further, the same reference number may be used with reference to different examples or different instances of a given item.

11 vehicle
13 radar system
15 electronic processing device
17 driving direction
19 traffic space
20 object
21 primary radar signal
22 secondary radar signal
25, 25' radar antenna assembly
27 crash beam
29 front surface
31 curved surface portion
33, 33' feed horn
35 reflector
36 passage
37 antenna element
39 conduit

What is claimed is:

1. A radar antenna assembly for a vehicle, the radar antenna assembly comprising:

a feed element configured to at least one of transmit or receive radar signals; and a metallic component of the vehicle that forms at least a part of a crash beam, a pillar, or a chassis, the metallic component of the vehicle comprising a curved or faceted surface portion, wherein the feed element is supported by a conduit that extends through a passage formed in the crash beam, pillar, or chassis, the feed element positioned such that the curved or faceted surface portion forms a reflector for the feed element.

2. The radar antenna assembly of claim 1, wherein:

the feed element is fixed to the metallic component of the vehicle.

3. The radar antenna assembly of claim 1, wherein:

in a mounted state of the metallic component of the vehicle, the curved or faceted surface portion faces away from a center of the vehicle.

4. The radar antenna assembly of claim 1, wherein:

the curved or faceted surface portion is cylindrically or elliptically shaped.

5. A vehicle comprising:

a chassis;

a body; and a radar antenna assembly comprising:

a feed element configured to at least one of transmit or receive radar signals; and a metallic component that forms at least a part of a crash beam, a pillar or the chassis comprising a curved or faceted surface portion, the feed element positioned such that the curved or faceted surface portion forms a reflector for the feed element, wherein the feed element is supported by a conduit that extends through a passage formed in the crash beam, pillar or chassis.

6. The vehicle of claim 5, wherein:

the metallic component has a surface area of at least 400 square centimeters (cm2).

* * * * *